No. 850,331. PATENTED APR. 16, 1907.
D. L. ADELSPERGER.
APPARATUS FOR TREATING COTTON SEED HULLS.
APPLICATION FILED MAY 23, 1906.
4 SHEETS—SHEET 1.
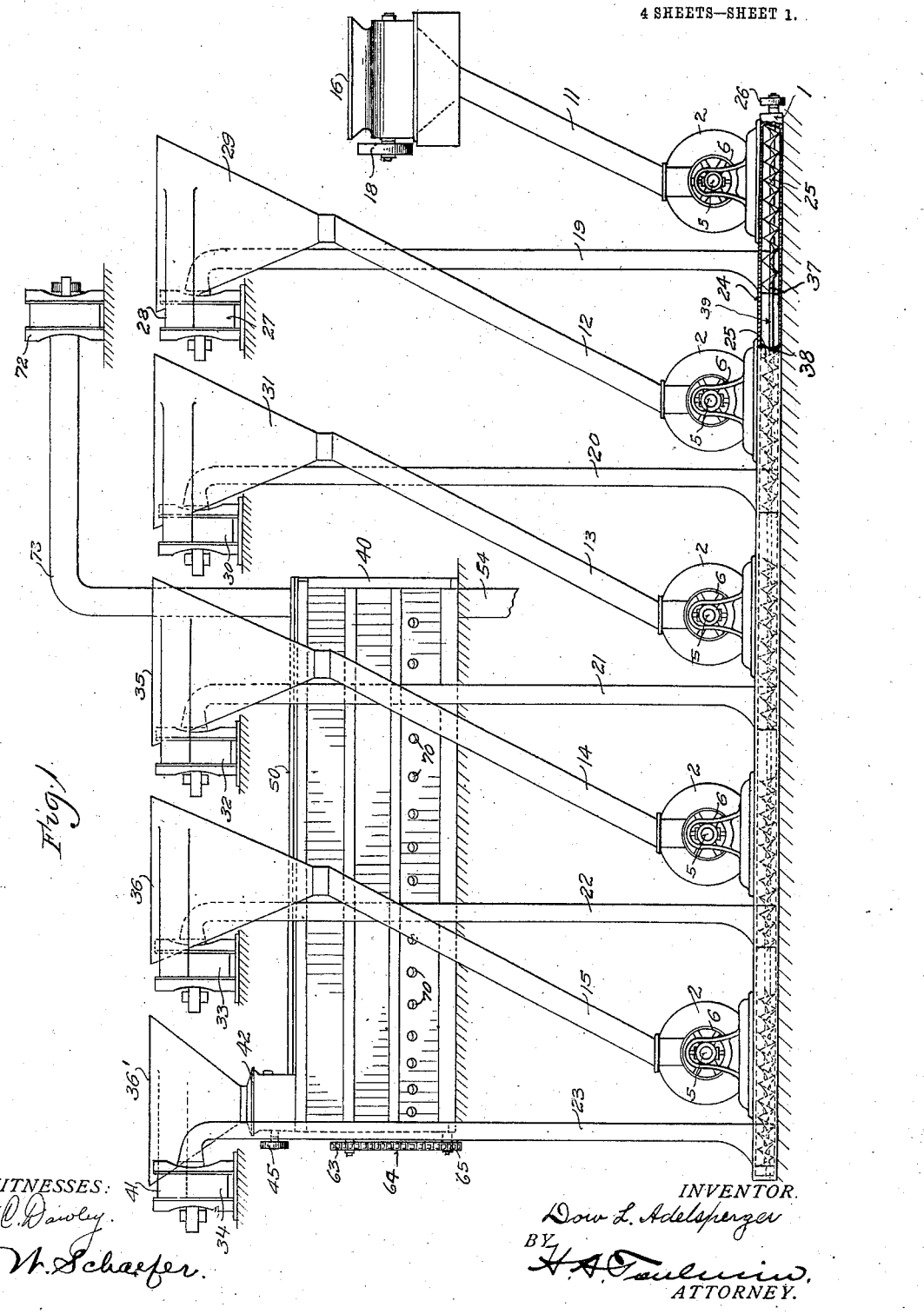
WITNESSES:
INVENTOR.
Dow L. Adelsperger
ATTORNEY.

No. 850,331. PATENTED APR. 16, 1907.
D. L. ADELSPERGER.
APPARATUS FOR TREATING COTTON SEED HULLS.
APPLICATION FILED MAY 23, 1906.
4 SHEETS—SHEET 2.
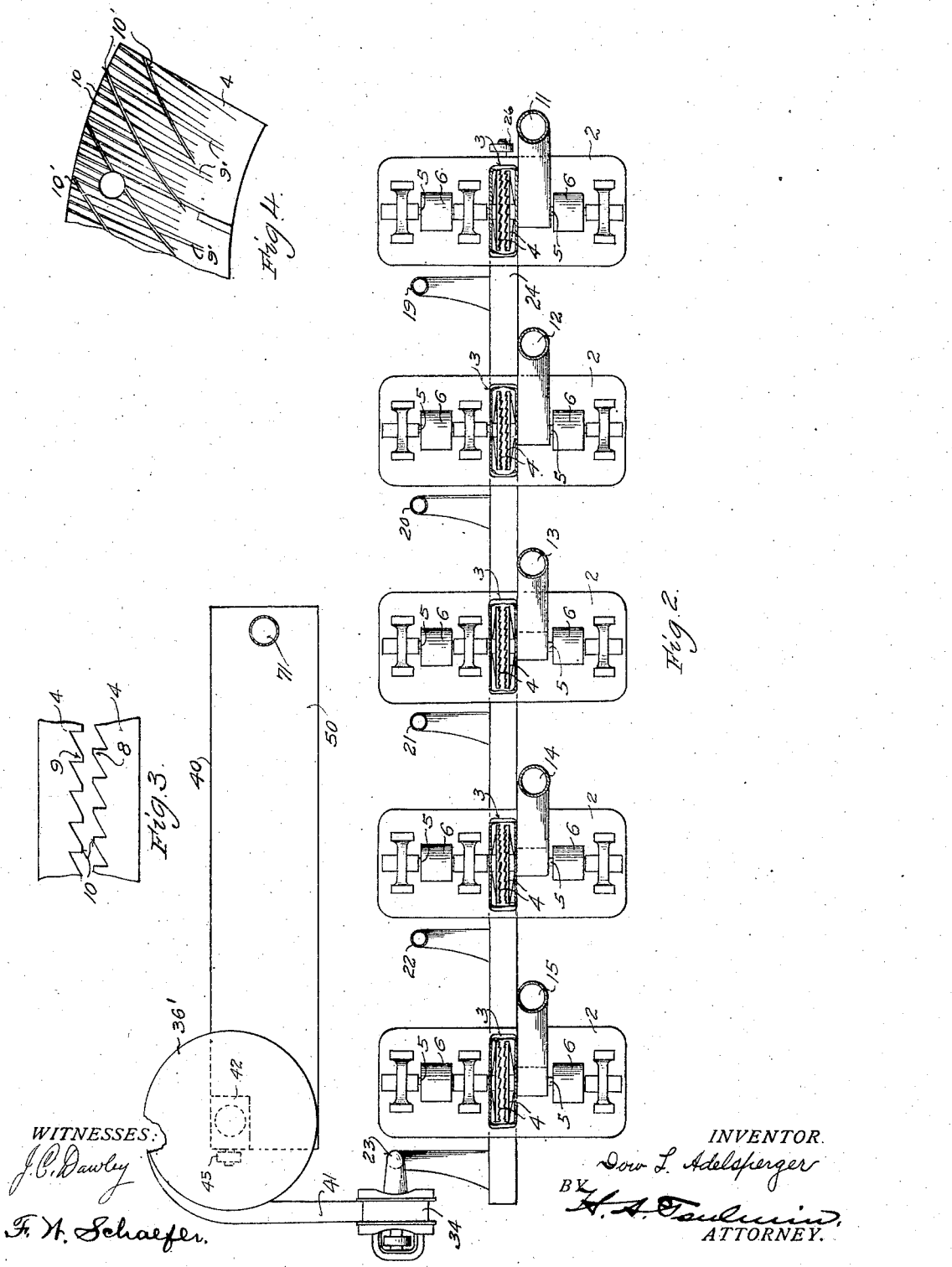
WITNESSES:
J. C. Dawley
F. N. Schaefer.
INVENTOR.
Dow L. Adelsperger
BY
H. A. Faulwin
ATTORNEY.

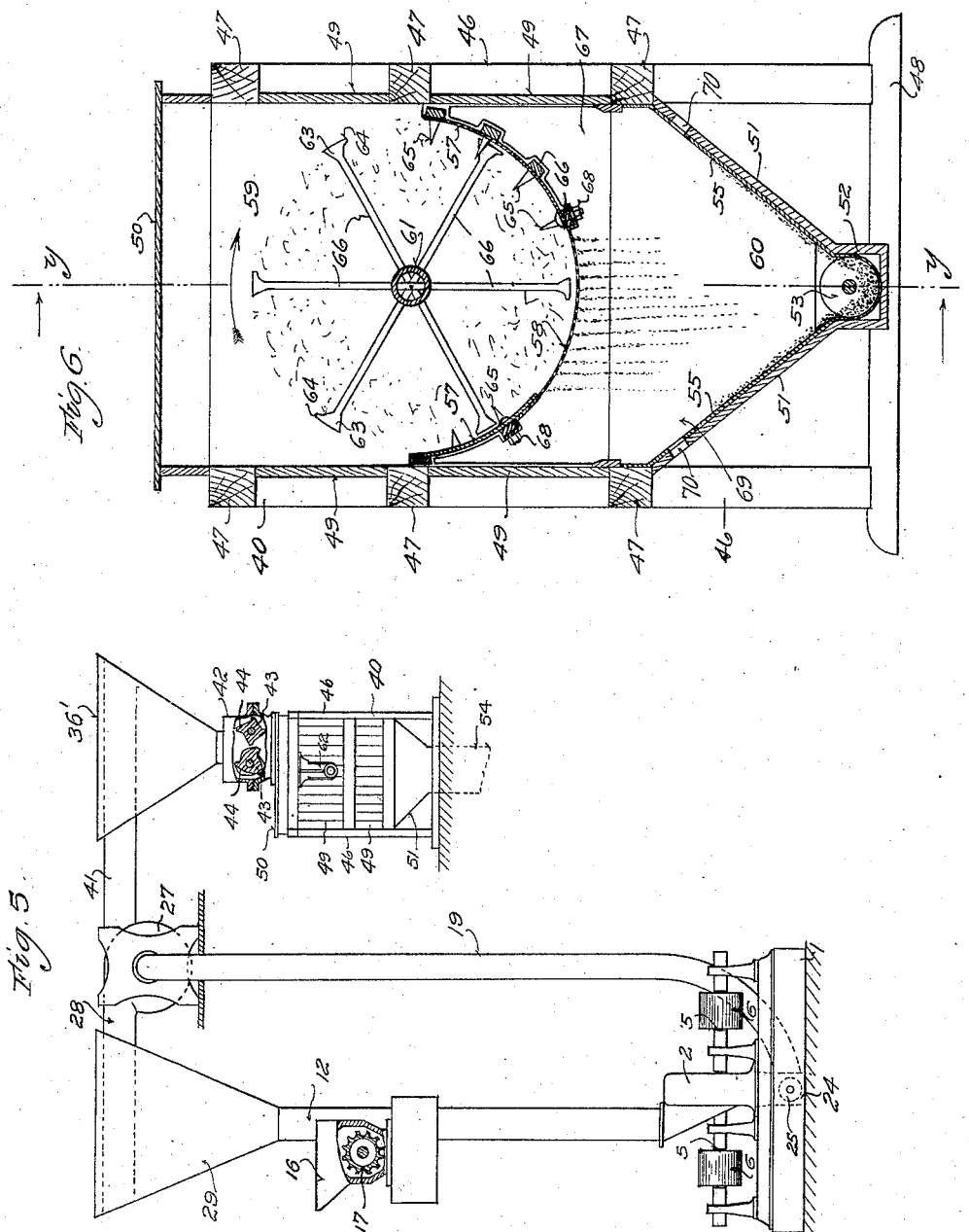

No. 850,331. PATENTED APR. 16, 1907.
D. L. ADELSPERGER.
APPARATUS FOR TREATING COTTON SEED HULLS.
APPLICATION FILED MAY 23, 1906.
4 SHEETS—SHEET 4.
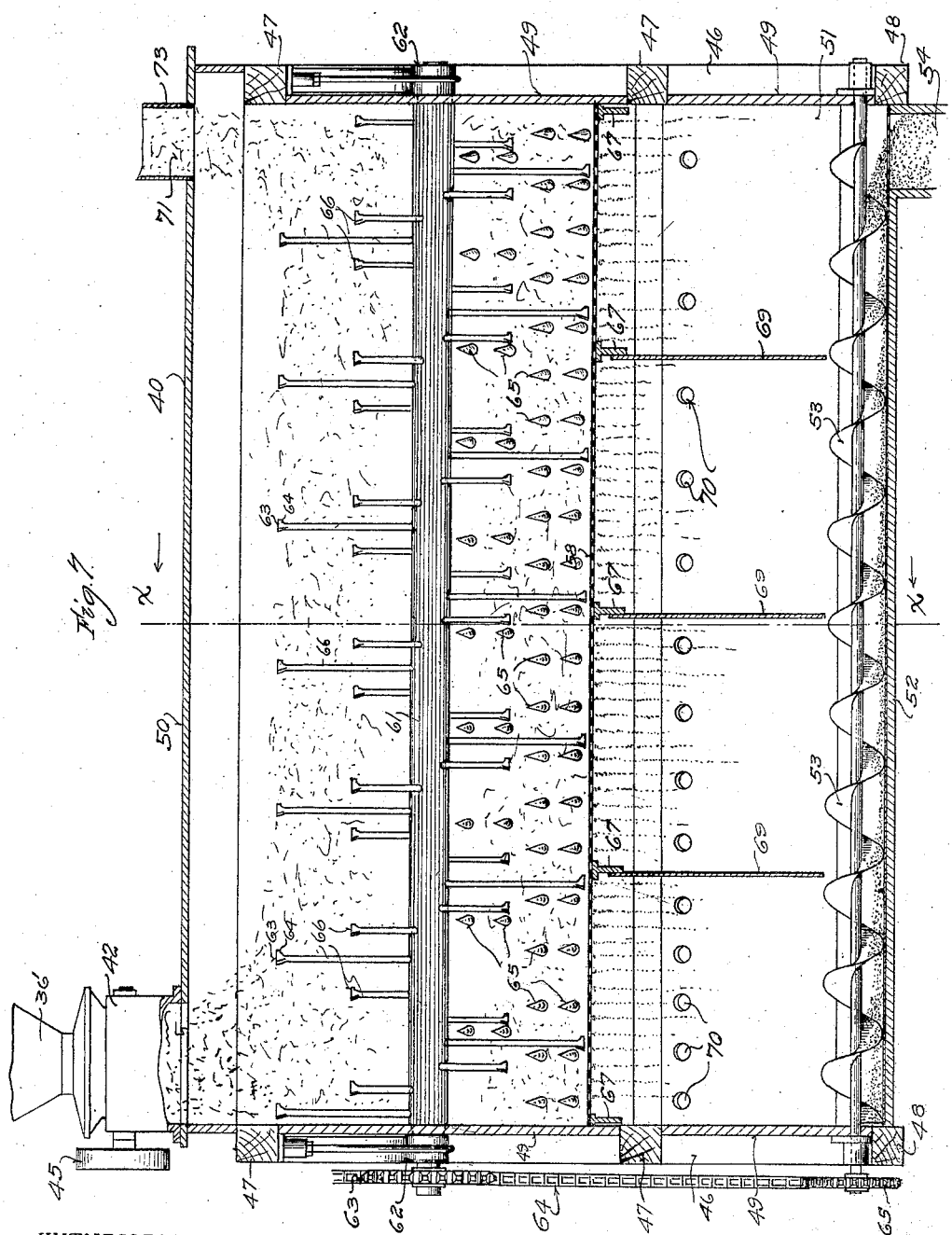
WITNESSES:
J. C. Dawley
F. W. Schaefer.
INVENTOR.
Dow L. Adelsperger
BY
ATTORNEY.

UNITED STATES PATENT OFFICE.

DOW L. ADELSPERGER, OF SPRINGFIELD, OHIO, ASSIGNOR TO THE FOOS MANUFACTURING COMPANY, OF SPRINGFIELD, OHIO, A CORPORATION OF OHIO.

APPARATUS FOR TREATING COTTON-SEED HULLS.

No. 850,331. Specification of Letters Patent. Patented April 16, 1907.

Application filed May 23, 1906. Serial No. 318,301.

*To all whom it may concern:*

Be it known that I, DOW L. ADELSPERGER, a citizen of the United States, residing at Springfield, in the county of Clark and State of Ohio, have invented certain new and useful Improvements in Apparatus for Treating Cotton-Seed Hulls, of which the following is a specification, reference being had therein to the accompanying drawings.

This invention relates to an apparatus for treating cotton-seed hulls to make a fiber product of the cotton adhering to the hulls and a bran product of the hulls themselves.

The invention consists in an apparatus by which the cotton-seed hulls will be subjected to a series of like grinding operations, the grinding agents in the successive grinding steps being all set alike or to grind with equal fineness, by which the ground mass so produced will be subjected in a receptacle or inclosure to a violent agitation or beating action to shake out and loosen up such ground mass, and by which when in this last condition the same will be subjected to the lifting or carrying action of air-currents and the descending action of gravity, so as to carry off the particles of cotton in one direction and allow the particles of ground hull to go off in another direction, thus by the combined forces of air-currents and gravity separating the two products.

The object in producing these two products is to form a paper-stock of the cotton fiber so reclaimed or material for upholstering purposes, as for stuffing horse-collars or horse-collar pads, &c., and to form of the ground hull so obtained a bran for use as an ingredient in stock food, as when mixed with a selected proportion of cotton-seed meal, which is the residuum of the cotton-seed meats left after the oil has been extracted therefrom. There is nothing new about the products here described, as they have been well known for many years, the novelty of my invention residing in my new apparatus.

In the accompanying drawings, Figure 1 is a side elevation of that part of the invention embodied in the apparatus; Fig. 2, a plan view of the same; Fig. 3, a detail enlarged elevation of a part of a pair of the grinding-disks; Fig. 4, a face view of a part of the same, these two figures showing the peculiar grinding-dress used on the grinding-heads; Fig. 5, an end elevation of said apparatus; Fig. 6, an enlarged transverse sectional view of the agitator, taken on the line $xx$ of Fig. 7 looking in the direction of the arrow, with the feeder omitted; and Fig. 7, a longitudinal sectional view of the agitator, taken on the line $yy$ of Fig. 6 looking in the direction of the arrow.

I will first describe the improved apparatus. Upon a suitable base or floor 1 I locate a series of grinding-mills, (designated at 2,) say, five mills. These mills are of any approved type of grinding-mills, each having a casing 3 inclosing a pair of grinding-heads 4, each head being mounted on a shaft 5, having, respectively, a pulley 6, by which the shafts are rotated through the medium of belts in opposite directions. These are grinding-mills as distinguished from attrition-mills, and the grinding-heads of all the mills are set the same distance apart, so that the treatment of the material in each mill is a repetition in kind and degree of the treatment of the material in each other mill. In Figs. 3 and 4 we have illustrated the preferred form of dress we give the grinding heads or plates, from which it will be seen that the heads have oppositely-set teeth 8 and 9, respectively, having slightly-flattened surfaces 10. These grinders also have feeding-ribs 9' and grooves 10', which latter facilitate the escape of the material beyond the periphery of the plates. These plates made in this way we have used in this apparatus, and they so grind the material that the hull comes out so reduced that the fiber is separated from it, leaving the two ground apart but matted together for the subsequent agitating and scattering action, followed by the application of the force of gravity and the force of air-currents, as presently to be more fully described.

Each mill is supplied with a feed-chute, respectively designated at 11, 12, 13, 14, and 15. The chute 11 leads from a feeder 16 of any approved type, preferably consisting of an outer casing with an inner fluted feed-roller 17, as shown in Figs. 1 and 5, driven by a pulley 18. In this feeder is introduced the cotton-seed hulls in the state in which they are left after they have passed out of the usual cotton-seed huller and the meats and hulls have been separated. Being so fed into the first mill, these hulls, with their adhering fiber, are ground into such fineness as will result from setting the opposite grinding-heads just so close together that they will not touch when in operation, say, a thirty-second or a sixteenth of an inch apart, or other fixed distance, all of the other mills of the series being likewise set to this setting of the first mill and each successive mill regrinding the material. It should be noted here also that it is preferred to feed the first mill with regulated quantities of the material, which is accomplished by the feeder referred to or may be accomplished by any equivalent feeder. Each mill is also provided with a discharge-chute, these chutes being respectively designated 19, 20, 21, 22, and 23. Each mill discharges into a trough 24, in which is mounted a rotatable conveyer or worm-screw 25, operated by a pulley 26. As seen in Fig. 1, where the base 1 is broken away, the material or ground mass of hull and cotton as it passes out of the first mill drops into the trough 24, whence it is carried along by the conveyer 25 until it reaches a point opposite the entrance of the discharge-chute 19, when it is immediately taken up by the action of a suction-fan, (designated at 27,) into whose casing this ground mass is carried and whence it is discharged through a conduit 28 (see Fig. 5) into the hopper 29 of the next succeeding feed-chute 12 for the next mill. This hopper is preferably of a type known as a "cyclone-hopper," meaning that it is organized in a fashion to prevent the air-blast by which the material is carried into it from materially blowing down or entering the chute that leads from such hopper. Then when this mass of material reaches the second mill it is again ground likewise as in the first mill, and discharging from the second mill it is again taken along by the worm-conveyer 25 until it reaches the discharge-chute 20, up which it is carried by the like action of another suction-fan 30, whence it is discharged into another cyclone-hopper 31, from which it is fed into the feed-chute 13 of the third mill. The operations just described are then repeated in the succeeding mills and their feed-chutes, discharge-chutes, suction-fans, designated, respectively, 32, 33, and 34, and their cyclone-hoppers, designated, respectively, 35 and 36, as also by the remaining portions of the worm-conveyer 25, operating between each mill and its discharge-chute. Those portions of this worm-conveyer between the discharge-chute of one mill and the place in the trough into which the material falls from the next mill—say between the points 37 and 38, (shown in Fig. 1)—are idle or perform no conveying function, but merely serve to connect the other portions of the conveyer together, so as to make a continuous device, all of whose sections will rotate by the application of power to the one pulley 26.

From the foregoing description it will be further understood that that portion of the material which is not sufficiently ground in a preceding mill is properly reduced in a subsequent mill.

Referring now to the agitator, the same is designated at 40 (see Fig. 1) and is preferably mounted upon an elevation somewhat higher than the plane of the mills, though this is not material. It will be seen from Figs. 1 and 5 that when the ground mass passes from the suction-fan 34 the last of the series through the discharge-pipe 41 it enters the cyclone-hopper 36', mounted on the feeder 42, which itself is mounted upon the agitator, as also seen in Figs. 1 and 5. This feeder 42 is of any approved type, but preferably such as generally shown in Fig. 5, wherein a casing is illustrated with two rotatable feed-rolls 43 therein, each roll having feeding-ribs or protuberances 44, which gather the material or ground mass and feed it on down from the hopper 36' into the agitator 40, these feed-rolls 43 receiving rotation from a pulley 45 (shown in Fig. 1) through suitable connections.

Referring now to Figs. 6 and 7, in which the agitator is shown in detail enlarged views, it will be seen that a frame of uprights 46 and horizontal timbers 47, with base-timbers 48, is inclosed by a housing composed of boards or panels 49 at the sides and ends, a cover or top 50, and inclined walls 51 to converge the lower part of the chamber so constituted, so as to terminate in a bran-trough 52, into which the bran settles and along which it is conveyed by the screw conveyer 53 to a suitable discharge-opening 54, where it is bagged or otherwise caught. By preference the walls 51, which are of wood, have a metallic lining 55 to cause the bran to more readily run down to the trough. We also prefer to line the walls 49 with similar metallic linings 56.

A concave transverse wall, partly imperforated and partly perforated, as shown, respectively, at 57 and 58, divides the agitator into an upper compartment 59 and a lower compartment 60, in the latter of which the bran gathers on its way to the trough 52 and into the former of which the ground mass of hulls and cotton fiber is fed from and by the feeder 42. In the compartment 59 is mounted a rotatable agitator proper or beater composed of a shaft 61, having suitable bearings at the end of the agitator, as suggested at 62, and carrying at one end a sprocket-wheel 63, operated by a sprocket-chain 64, which also passes over a sprocket-wheel 65, carried by the worm 53; but these are details which may be modified. The agitator or beater proper further consists of a series of radial arms or spokes 66, preferably set in a spiral line on the shaft 61, as seen in Fig. 7. These arms or spokes have at their outer ends blades 63, which stand with their forward face at an angle to their axis of rotation, so that they will act to not only agitate and beat the tangled mass of ground hull and fiber, but also to advance the same toward the opposite end of the agitator from that at which this material is received. This advancing of the material facilitates not only its disentanglement and shaking up, but also facilitates the operation of air-separation to be presently referred to. These blades 63 are also reduced to a rather pointed advance end, as shown at 64, which aids their entrance into the melted mass. The speed of this agitator proper or beater is preferably from one hundred to one hundred and ten revolutions per minute. Coöperating with this device are a series of fixed teeth 65, secured along the imperforated portions 57 of the concave wall. The shanks of these teeth 65 extend through the wall 57 and through strips of wood 66, supported by transverse plates 67, preferably of cast metal, secured at intervals along the agitator and forming supports for the concave wall 57 58. The shanks have nuts 68 to secure them. To these plates 67 three are secured transverse partitions 69. (See Fig. 7.) These are preferably of sheet metal, and they stand across the compartment 60 and divide it into divisions for a purpose presently to be stated.

Referring now to the means for effecting the separation of the cotton fiber from the bran, and particularly to Fig. 7, it will be seen that the walls of the compartment 60 are provided with a series of perforations 70, decreasing in number between each two of the partitions 69 as you approach the division nearest the orifice 71 in the agitator-casing, through which the suction-fan 72, through its pipe 73, (see Fig. 1,) draws the air which enter at these perforations 70. The purpose in so graduating the number of these perforations is to equalize the air-suction throughout the agitator, the perforations being more numerous as you proceed more remotely from the fan-orifice 71. The same result may be obtained by graduating the size of the perforations, though leaving their number equal between each partition 69.

It will now be understood that as the agitator proper or beater disentangles and loosens up the matted mass of fiber and bran the air-currents passing through the agitator from the orifices 70 to the fan-opening 71 take up the particles of fiber and carry them off to and through the fan 72, from which they are discharged and collected in any suitable manner, while the force of gravity acting upon the particles of bran causes them to settle on the perforated portion 58 of the concave wall and to pass on down into the compartment 60 and finally into the trough 52. The partitions 69 tend to equalize the action of the air-currents passing into and out of the machine and to force the currents entering through each set of perforations to go thence upward and into the upper compartment 59. It will be understood also that the centrifugal action of the agitator or beater proper enters into this loosening up and separating of the mass into a fluffy state, so that the particles of bran are liberated or permitted to fall as the air-currents lift away the particles of fiber. What is here stated is based upon the practical use of this apparatus, and it is found that the bran is clean and free of fiber, while the fiber is so completely liberated of the intermixed bran that it too is a clean product. The bran passes through the perforations in the section 58 of the concave; but the fiber remains in the upper compartment until it passes therefrom along with the outgoing air-currents. Thus in the operation of this apparatus we produce the products referred to by a succession of like grinding operations produced by a succession of grinding-mills all set alike followed by a violent agitation of the matted mass coming from the mills to loosen up and shake out such mass into a thin fluffy state, which in turn is followed by a simultaneous application of the force of gravity tending in one direction and the force of air-currents tending in another direction, with the air-currents regulated in force to the material they are to carry off, but insufficient to overcome the gravity of the heavier product—namely, bran.

Having thus fully described my invention, what I claim as new, and desire to secure by Letters Patent, is—

1. In an apparatus of the character described, a series of grinding-mills all set alike in operation, a feed-chute and a discharge-chute for each mill, each discharge-chute discharging into the feed-chute of the next succeeding mill, and an agitator-casing into which the discharge-chute of the last mill discharges, said agitator-casing having agitating means proper to shake out the ground mass so fed to it, and having a bran-discharge passage and air-inlet means, and means for passing a current of air through said agitator-casing to carry off the fiber, while the bran gravitates and escapes.

2. In an apparatus of the character described, a series of grinding-mills all set alike in operation, a feed-chute and a discharge-chute for each mill, a fan-blower for each discharge-chute and connecting with the feed-chute of the next succeeding mill, and an agitator-casing into which the blower of the last mill discharges, said agitator-casing being divided into two compartments, a revoluble agitator proper in one of said compartments to shake out and carry the ground mass in and along said compartment, a fan-blower connected to said compartment, a wall between the compartments partly imperforate and partly perforated, the lower compartment having air-inlet orifices through which said fan-blower draws air-currents through said perforated walls and into the other compartment, whereby the fiber is carried off by such air-currents, while the bran is discharged through said perforated wall.

3. In an apparatus of the character described, a series of grinding-mills, a feed-chute and a discharge-chute for each mill, the discharge-chute of each preceding mill arranged to discharge into the feed-chute of the succeeding mill, and an agitator-casing into which the discharge-chute of the final mill discharges, agitating means proper operating within the agitator to shake out the mass of ground material, the agitator-casing having means for the discharge of the bran and air-inlet orifices, and an air-fan to draw currents of air through said orifices and into and out of the agitator-casing to carry off the fiber.

4. In an apparatus of the character described, a series of grinding-mills each having a feed-chute and a discharge-chute, the discharge-chute of each preceding mill discharging into the feed-chute of the next mill, an agitator-casing into which the discharge-chute of the last mill discharges, the agitator-casing being divided into two compartments, agitating means proper operating in one of the compartments to shake out the mass of ground material fed into it, the wall between the two compartments being partly imperforate and partly perforated, said agitator proper operating above said wall, and conveyer means below the wall to carry off the bran, there being air-inlet orifices below said wall, a fan-blower connected to the compartment above the wall and adapted to draw air-currents through said orifices and through the perforated portion of said wall, whereby the bran may gravitate through said perforated wall to the conveyer and whereby the lint is carried away from the bran and out of the agitator.

5. In an apparatus of the character described, a series of grinding-mills, a feed-chute and a discharge-chute for each mill, a fan-blower connected with each discharge-chute and with the feed-chute of the next succeeding mill, an agitator connected with the fan of the discharge-chute of the last mill, said agitator comprising a casing having an upper and lower compartment, a wall between them partly imperforate and partly perforated, a revoluble agitator proper mounted in the upper compartment and adapted to shake out the matted ground material and to move it lengthwise of the compartment, partitions across the lower compartment and a conveyer near the bottom thereof, the lower compartment having a series of air-inlet orifices between said partitions and below the perforated wall, and a fan-blower connected with the upper compartment and adapted to draw air through said orifices and said perforated wall and to gather the fiber as the material is shaken out and passed along in the upper compartment, said perforated wall allowing the escape of the bran to the conveyer.

6. In an apparatus of the character described, a series of grinding-mills all set alike in operation, a conveyer and trough beneath them, a feed-chute for each mill, a discharge-chute for each mill connecting with said trough, a fan-blower connected with each discharge-chute and discharging into the feed-chute of the next succeeding mill, and an agitator-casing in which the fan-blower of the discharge-chute of the last mill discharges, said agitator-casing comprising two compartments divided by a wall partly imperforate and partly perforated, one compartment having partitions, air-inlet orifices and a bran-conveyer, and the other compartment a revoluble agitator consisting of a shaft having beating and feeding arms to shake out and carry the mass of ground material in and along that compartment, a fan-blower connected with this compartment and operating to draw air-currents through said orifices and through the perforated wall, and thence through and out of this compartment, to gather up the fiber particles, while the bran gravitates through the perforated wall and past the air-currents.

7. In an apparatus of the character described, an agitator comprising a frame and casing, a concave wall within the casing partly imperforate and partly perforated, teeth carried by the imperforate portion, a revoluble agitator proper mounted above the concave and having radial arms with blades set to advance the material through the compartment while shaking it up, the compartment below the concave having inclined side walls terminating in a trough and provided with apertures, a conveyer in the trough, and having cross-partitions and a series of air-inlet orifices, and a fan-blower connected with a compartment above the concave and adapted to pass a current of air through both of said compartments, substantially as described.

In testimony whereof I affix my signature in presence of two witnesses.

DOW L. ADELSPERGER.

Witnesses:
E. L. SUTTON,
G. T. ROBBINS